United States Patent
Burton et al.

(10) Patent No.: US 10,311,405 B2
(45) Date of Patent: Jun. 4, 2019

(54) SOFTWARE-ISSUE GRAPHS

(71) Applicant: CA, Inc., Islandia, NY (US)

(72) Inventors: Jacob Burton, Islandia, NY (US);
Andrew Homeyer, Islandia, NY (US);
Kelli Hackethal, Islandia, NY (US);
Megan Espeland, Islandia, NY (US);
Mary Davis, Islandia, NY (US)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 15/655,187

(22) Filed: Jul. 20, 2017

(65) Prior Publication Data
US 2019/0026697 A1    Jan. 24, 2019

(51) Int. Cl.
*G06F 9/44* (2018.01)
*G06Q 10/10* (2012.01)
*G06F 8/71* (2018.01)

(52) U.S. Cl.
CPC ............. *G06Q 10/103* (2013.01); *G06F 8/71* (2013.01)

(58) Field of Classification Search
CPC ............................... G06Q 10/103; G06F 8/71
USPC .......................................................... 717/124
See application file for complete search history.

(56) References Cited

U.S. PATENT DOCUMENTS 9,244,510 B1 *  1/2016  Conrad .................... G06F 11/30
9,448,791 B1 *  9/2016  McFarlane ................ G06F 8/71
2010/0211924 A1 *  8/2010  Begel ........................ G06F 8/74
                                                                717/101
2011/0093263 A1 *  4/2011  Mowzoon ............... G10L 15/26
                                                                704/235
2011/0161933 A1 *  6/2011  Hudson ............... G06F 11/0769
                                                                717/125
2013/0332929 A1     8/2013  Brown et al.
2014/0181791 A1 *  6/2014  Amano ............... G06F 11/3684
                                                                717/121
2014/0195258 A1     7/2014  Burton et al.
2014/0201702 A1 *  7/2014  Kaplinger ................. G06F 8/76
                                                                717/101
2016/0048780 A1     2/2016  Sethumadhavan et al.
2016/0199977 A1     3/2016  Breazeal
2016/0103932 A1 *  4/2016  Sathish ............. G06F 17/30705
                                                                715/767
2016/0223704 A1     8/2016  Donderici et al.
2016/0292062 A1 * 10/2016  Bommaraju .......... G06F 11/362
(Continued)

OTHER PUBLICATIONS

Sandusky et al, Bug Report Networks: Varieties, Strategies, and Impacts in a F/OSS Development Community, 2004, researchgate.net (Year: 2004).*

(Continued)

*Primary Examiner* — Anna C Deng
(74) *Attorney, Agent, or Firm* — Pillsbury Winthrop Shaw Pittman LLP

(57) ABSTRACT

Provided is a process, including: obtaining a plurality of software-issue reports; obtaining a pull request; forming a software-issue graph having a plurality of nodes corresponding to the software-issue reports and a plurality of edges indicating relationships between the software-issue reports; determining that the pull request addresses a given software-issue report; selecting a subset of nodes in the software-issue graph addressed by the pull request; and designating the pull request as being associated with the plurality of software-issue reports corresponding to the selected subset of nodes.

18 Claims, 3 Drawing Sheets

(56) References Cited

U.S. PATENT DOCUMENTS

| | | | |
|---|---|---|---|
| 2016/0299991 A1* | 10/2016 | Hong | G06F 17/30958 |
| 2016/0328661 A1* | 11/2016 | Reese | G06N 99/005 |
| 2017/0061341 A1 | 3/2017 | Haas et al. | |
| 2017/0076246 A1 | 3/2017 | Volkov et al. | |

OTHER PUBLICATIONS

TracTicket, Ticket dependency graph, 2015, trac-hacks.org (Year: 2015).*

Jindal et al., Software Defect Prediction Using Neural Networks, 2014, IEEE, (Year: 2014).*

Mak, A learning algorithm for Recurrent Radial Basis Function Networks, 1995, Neural Processing Letters, vol. 2, p. 27-31 (Year: 1995).*

Dartmouth, Markov Chains, 2016, dartmouth.edu (Year: 2016).*

'Using Machine Learning to Predict Project Effort: Empirical Case Studies in Data-Starved Domains', Boetticher, Gary, http://citeseerx.ist.psu.edu/viewdoc/download?doi=10.1.1.19.111&rep=rep1&type=pdf,Nov. 30, 2001, pp. 1 to 8.

'Requesting a pull request review—User Documentation', https://help.github.com/articles/requesting-a-pull-request-review/, Jul. 6, 2017, pp. 1 to 1.

'Introducing code owners', The GitHub Blog: New Features—GitHub, https://github.com/blog/category/ship, Jul. 6, 2017, pp. 1 to 17.

'A Beginner's Guide to Recurrent Networks and LSTMs', https://web.archive.org/web/20170211031824/https:// deeplearning4j.org/lstm.html, Feb. 11, 2017, pp. 1 to 11.

'A Machine Learning Approach to Workflow Management', https://www.researchgate.net/publication/2488841_A_Machine_Learning_Approach_to_Workflow_Management, Apr. 2000, pp. 1 to 12.

'Hidden Markov model, Wikipedia, https://web.archive.org/web/20170716021244/https://en.wikipedia.org/wiki/Hidden_Markov_model', Jul. 16, 2017, pp. 1 to 18.

'Integrating Machine Learning and Workflow Management to Support Acquisition and Adaptation of Workflow Models', http://citeseerx.ist.psu.edu/viewdoc/download?doi=10.1.1.16.4479&rep=rep1&type=pdf, Jun. 14, 2000, pp. 1 to 48.

'Waffle.io • Work Better on GitHub Issues', https://web.archive.org/web/20160708122437/https://waffle.io/, Jul. 8, 2016, pp. 1 to 11.

'The Mythical Man-Month', Wikipedia, https://web.archive.org/web/20170610193959/https://en.wikipedia.org/wiki/The_Mythical_Man-Month, Jun. 10, 2017, pp. 1 to 5.

'Estimation (project management)', Wikipedia, https://web.archive.org/web/20170223144543/https://en.wikipedia.org/wiki/Estimation_(project_management), Feb. 23, 2017, pp. 1 to 2.

'Event chain methodology', Wikipedia, hhttps://web.archive.org/web/20161113172208/https://en.wikipedia.org/wiki/Event_chain_methodology, Nov. 13, 2016, pp. 1 to 4.

'Estimating Techniques', 4PM.com—Project Management Basics, https://web.archive.org/web/20170606113131/http://www.4pm.com/category/larger-projects/estimating-techniques/, Jun. 6, 2017, pp. 1 to 7.

'Configuring Estimation and Tracking', https://confluence.atlassian.com/agile/jira-agile-user-s-guide/configuring-a-board/configuring-estimation-and-tracking, Feb. 23, 2015, pp. 1 to 3.

'Estimating an Issue', https://confluence.atlassian.com/agile/jira-agile-user-s-guide/working-with-issues/estimating-an-issue, Feb. 23, 2015, pp. 1 to 4.

'Latent Dirichlet allocation', Wikipedia, https://web.archive.org/web/20170707015231/https://en.wikipedia.org/wiki/Latent_Dirichlet_allocation, Jul. 7, 2017, pp. 1 to 9.

'Latent semantic analysis', Wikipedia, https://web.archive.org/web/20170623021209/https://en.wikipedia.org/wiki/Latent_semantic_analysis, Jun. 23, 2017, pp. 1 to 14.

'Natural language processing', Wikipedia, https://web.archive.org/web/20170624070249/https://en.wikipedia.org/wiki/Natural_language_processing, Jun. 24, 2017, pp. 1 to 5.

'Automation in the Bug Flow', http://www.slideshare.net/borgmarkus/automation-in-the-bug-flow-machine-learning-for-triaging-and-tracing, Oct. 29, 2014, pp. 1 to 43.

'Automated Bug Assignment: Ensemble-based Machine Learning in Large Scale Industrial Contexts', Empirical Software Engineering, http://lup.lub.lu.se/search/ws/files/1859620/7865979.pdf, Jan. 1, 2015, pp. 1 to 53.

'Bug Prediction at Google', Google Engineering Tools, http://google-engtools.blogspot.com/2011/12/bug-prediction-at-google.html, Dec. 14, 2011, pp. 1 to 14.

U.S. Appl. No. 15/655,119, filed Jul. 20, 2017, pp. 1 to 54.

U.S. Appl. No. 15/655,099, filed Jul. 20, 2017, pp. 1 to 49.

U.S. Appl. No. 15/655,211, filed Jul. 20, 2017, pp. 1 to 46.

* cited by examiner

SOFTWARE-ISSUE GRAPHS

BACKGROUND

1. Field

The present disclosure relates generally to project management software applications and, more specifically, to software software-issue graphs for project management software applications.

2. Description of the Related Art

Many software-development projects are relatively complex. Often dozens or hundreds of developers or operations engineers contribute to writing and modifying computer code, in many cases, across multiple branching and merging versions of the code, which can run into ten-of-thousands of lines of code in many projects. In many cases, teams use project management applications to track and coordinate their workflows in development tasks, such as a software-development workflow tracking system. Often the number of issues tracked in a software-development workflow tracking system (like a bug tracker) is very large (e.g., in the hundreds or thousands). And often the reported issues are duplicative, overlapping, or are caused by one another.

Often the number of issues tracked can be overwhelming for developers when making changes to code and selecting among those issues to determine which issues to address next or to determine which issues are addressed by a code change. Software issues are often described with different language referring to the same phenomena. As a result, it can be very difficult to determine how the different issues are related to one another.

These relationships can affect which issues a developer works on next and how the developer updates a repository of the issues upon submitting a code change. These challenges are aggravated in many commercial use cases by the scale of issues that can accumulate over time and by the diversity of relationships that the different issues can have to one another. Existing computer systems for tracking software issues are not well suited for making fine-ingrained decisions on large-scale sets of issues that account for these various types of relationships.

SUMMARY

The following is a non-exhaustive listing of some aspects of the present techniques. These and other aspects are described in the following disclosure.

Some aspects include a process including: obtaining, with one or more processors, a plurality of software-issue reports, each software-issue report describing a software bug to be fixed or feature to be added to a software application; obtaining, with one or more processors, a pull request identifying a branch of source code of the software application in a version control system; forming, with one or more processors, a software-issue graph having a plurality of nodes corresponding to the software-issue reports and a plurality of edges indicating relationships between the software-issue reports, wherein forming the software-issue graph comprises at least one of the following: determining that a first software-issue report must be addressed before a second software-issue report and, in response, adding an edge to the software-issue graph indicating the first software-issue report must be addressed before the second software-issue report; determining that a third software-issue report is a duplicate of a fourth software-issue report and, in response, adding an edge to the software-issue graph indicating the third software-issue report is a duplicate of the fourth software-issue report; or determining that a fifth and a sixth software-issue report each are a species of a seventh software-issue report and, in response, adding a pair of edges to the software-issue graph indicating the fifth and the sixth software-issue report each are a species of the seventh software-issue report; determining, with one or more processors, that the pull request addresses a given software-issue report; selecting, with one or more processors, a subset of nodes in the software-issue graph addressed by the pull request based on the subset of nodes sharing a respective edge with the given software-issue report and respective relationships indicated by the shared edges; and designating, with one or more processors, in memory, the pull request as being associated with the given software-issue report and the plurality of software-issue reports corresponding to the selected subset of nodes.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
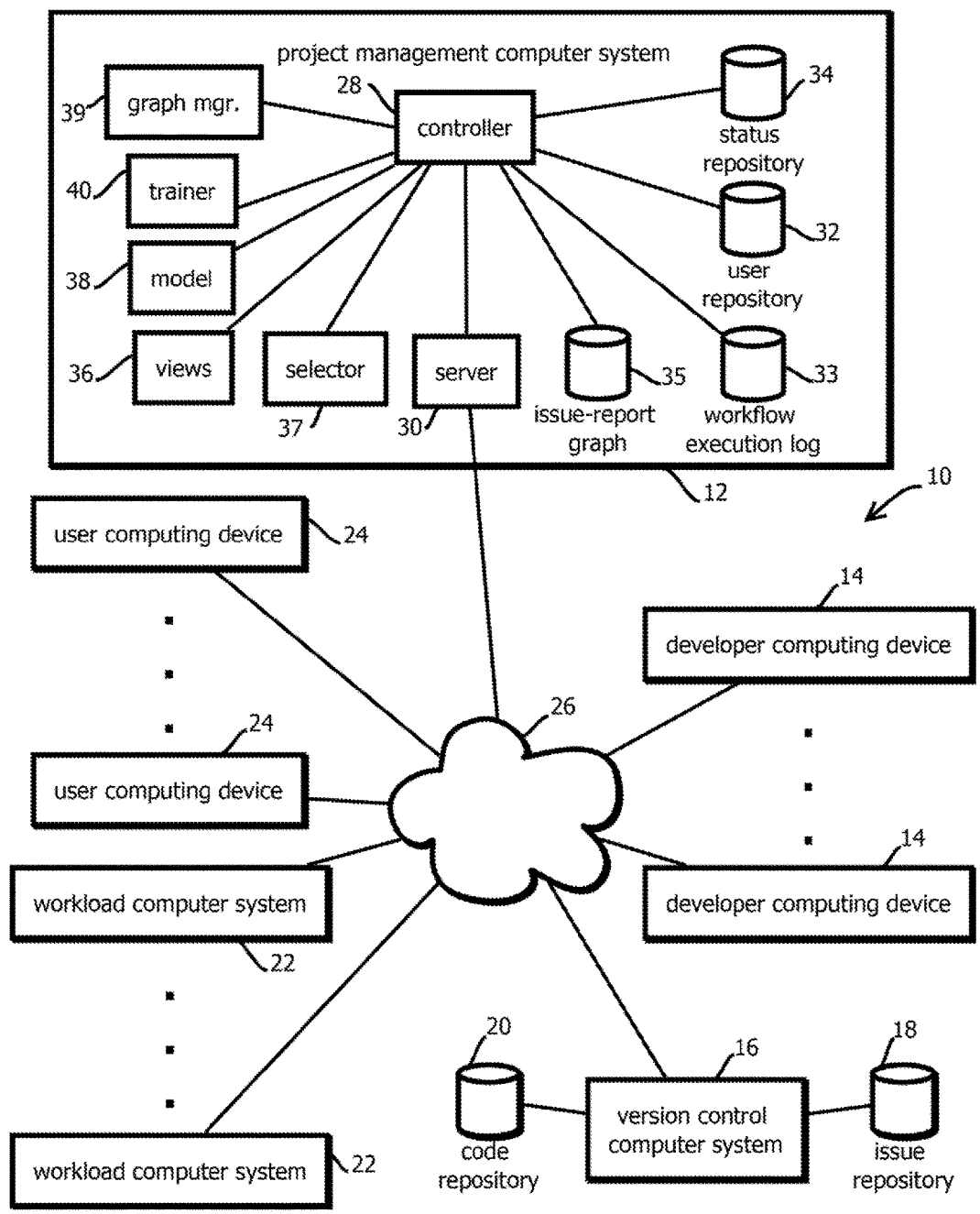
FIG. 1 shows an example of a project management computer system in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of computer science, data science, and software-development tooling. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

In some embodiments, the project management computer system 12 may mitigate some of the above-described issues and other issues described below or that will be apparent to those of ordinary skill in the art upon review of the present disclosure. In some embodiments, the project management computer system 12 is configured to construct a graph of software-issue reports (e.g., bug reports or feature requests) that indicates relationships between the various software-issue reports (e.g., duplicates, issues that must be fixed before others can be fixed, or genus-species relationships of issues). In some cases, feature requests may relate to non-user-facing aspects and tasks, such as cleanup, maintenance, refactoring, deploy/release tasks. Some embodiments may interrogate this graph to assist users of the project management computer system 12 with management of relatively large number of issues, for example, in a hosted multi-tenant software-as-a-service application accessed via a web browser or special-purpose native application. In some embodiments, the graph may facilitate relatively fast searches of a repository of software-issue reports and may encode relationships therebetween in a relatively memory-efficient form. Further, this data structure is expected to be relatively flexible and open to further augmentation of the records with evolving data models. Some embodiments may populate parameters of this data structure automatically, for example, with machine-learning models trained upon previous user entries referencing or in older software-issue reports. It should be noted, though, that not all embodiments necessarily provide all of these benefits, as various independently useful techniques are disclosed herein, which is not to suggest that any other portion of this description is limited to the arrangement described.

In some embodiments, these and other techniques may be implemented in a computing environment 10 (including each of the illustrated components) shown in FIG. 1 having the illustrated project management computer system 12. The project management computer system 12 may be configured to track the status of software-related projects (and other projects) through workflows by implementing techniques like those described above. In some embodiments, this project management computer system 12 may execute processes described below with reference to FIG. 2 and may be implemented with one or more of the computer systems (also called a computing device) shown in FIG. 3.

In some embodiments, the computing environment 10 includes a plurality of developer computing devices 14, a version control computer system 16 having an issue repository 18, a code repository 20, a plurality of workload computer systems 22, and a plurality of computing devices 24. In some cases, the computer systems may be a single computing device or a plurality of computing devices, for instance, executing in a public or private cloud. In some embodiments, these computing devices may communicate with one another through various networks, such as the Internet 26 and various local area networks.

In some embodiments, the developer computing devices 14 may be operated by developers that write and manage software applications. In some cases, source code for the software applications may be stored in the version control computer system 16, for instance, in the code repository 20. In some cases, this code may be executed on the workload computer systems 22, and in some cases, user computing devices 24 may access these applications, for instance, with a web browser or native application via the Internet 26 by communicating with the workload computer systems 22. In some embodiments, the computing environment 10 and the project management computer system 12 are multi-tenant environments in which a plurality of different software applications operated by a plurality of different entities are executing to serve a plurality of different groups of user computing devices 24. In some cases, groups of developer computing devices 14 may be associated with these entity accounts, for instance, in the version control computer system 16 and the project management computer system 12, such that developers associated with those accounts may selectively access code and projects in these respective systems.

In some embodiments, the version control computer system 16 having the repositories 18 and 20 is a Git version control system, such as GitHub™, Bitbucket™, or GitLab™. Or embodiments are consistent with other types of version control systems, including Concurrent Versions System™, or Subversion™. In some cases, the version control computer system 16 includes a plurality of different version histories of a plurality of different software applications in the code repository 20. In some embodiments, the version control computer system 16 may organize those records in an acyclic directed graph structure, for instance, with branches indicating offshoots in which versions are subject to testing. In some cases, these offshoots may be merged back into a mainline version. In some embodiments, some versions may be designated as production versions or development versions. In some embodiments, the source code in each version may include a plurality of subroutines, such as methods or functions that call one another, as well as references to various dependencies, like libraries or frameworks that are called by, or that call, these subroutines. In some cases, a given version of software may be characterized by a call graph indicating which subroutines call which other subroutines or libraries or frameworks. In some cases, the source code may include various reserved terms in a programming language as well as tokens in a namespace managed by the developer or a developer of libraries or frameworks. These reserve terms may include variable names and names of subroutines in the source code, libraries, or frameworks that are called. Some embodiments may leverage the resulting namespaces to infer priorities of software-issue reports or relationships between pull requests and software-issue reports.

In some embodiments, the version control computer system 16 may further include an issue repository 18. In some cases, developers, through developer computing devices 14 or users through user computing devices 24 may submit software-issue reports indicating problems with software or requested features for software executing on the workload computer systems 22. In some embodiments, each resulting software-issue report may include a description of the issue, for instance in prose, entered by a user or developer describing the problem. In some cases, the description may be in a human-readable, non-structured format and may range in length from three words up to several hundred or several thousand words or more. In some cases, the software-issue reports may be accumulated via submission to CA Agile Central, available from CA Inc. of Islandia, N.Y.

In some cases, the software-issue reports may also include structured data, for instance, based on check boxes, radio buttons, or drop-down menu selections by a user or developer submitting a software-issue report via a user interface that the version control system 16 or project management computer system 12 causes to be presented on their respective computing device. In some cases, these values may indicate severity of an issue, whether the issue is a request for a new feature or a request to fix a problem, values indicating a type of the problem, like whether it relates to security, slow responses, or problems arising in a particular computing environment. In some cases, the request may also include a description of the computing device upon which the problem is experienced, like a manufacturer, operating system, operating system version, firmware versions, driver versions, or a geolocation of the computing device. In some cases, the report further includes timestamp indicating when the software-issue report was submitted and an identifier of a software application to which the report pertains, such as one of the software applications associated with a version history in the code repository 20 and an application executing on some of the workload computer systems 22. In some cases, each software application may include an application identifier used by the version control system to identify that software application in the code repository 20 and the issue repository 18. In some cases, one or more of these software issue reports may be addressed by a workflow instance created to address the software issue report, in some cases, based on a template workflow specifying, for instance, tasks like triage, code change, manager review, unit tests, quality assurance, limited release, and full release.

In some embodiments, the version control system 16 may also maintain accounts associated with different entities authorized to access source code associated with each of a plurality of different applications and roles and permissions of developers associated with respective credentials by which developers associated with those entities make changes to the source code. In some embodiments, developers may submit changes to source code in the code repository 20, for instance, with a "commit" in some embodiments, each commit may be associated with a timestamp, a unique identifier of the commit, an application, and a branch and location in a branch in a version history of the application in the code repository 20. In some embodiments, the commits may be encoded as differences between a current version in the respective branch and the committed version, for instance, identifying code that is deleted and identifying code that is added as well as including the deletions and additions. In some cases, this may be characterized as a "diff" relative to the existing code in the most current version of a branch to which the changes submitted. In some cases, a developer may communicate to others on a software development team that they wish to merge a branch of code to which a commit is submitted back into another branch (like a mainline branch) of the source code with a pull request. In some cases, this pull request may spawn a workflow like those described herein. In some cases, the pull request may be associated with software-issue reports with the process of FIG. 2.

In some embodiments, the submission may be made by the developer computing devices 14 directly to the version control computer system 16, and the version control system 16 may emit an event indicative of the submission to the project management computer system 12, which may execute an event handler configured to initiate the described responsive actions. Or in some cases, the submissions may be sent by the developer computing devices 12 to the project management system 12, which may then send the changes to the version control computer system 16. Or the version control computer system 16 or the repositories 18 or 20 may be integrated with the project management computer system 12.

In some embodiments, the project management computer system 12 is configured to track the status of a plurality of different projects for a plurality of different tenants. In some cases, the projects relate to development and maintenance of the software applications described above. In some cases, the project management computer system 12 is further configured to manage and track workflows by which these projects are implemented and maintained, for instance, routing tasks from one user to another user, such as a developer users or operations engineer users, as a given project is advanced through a series of tasks in the project. Further, in some cases, the project management computer system 12 is configured to form and cause the presentation of various dashboards and displays indicative of the status of the projects and task queues of respective users having tasks assigned to them, their group, or to someone in their role. Corresponding records may be created, updated, and accessed by the project management computer system 12 in memory to effectuate this functionality.

To these ends or others, in some embodiments, the project management computer system 12 includes a controller 28, a server 30, a user repository 32, a workflow execution log, a status repository 34, an software-issue graph 35, a view generator 36, a selector module 37, a models module 38, a graph manager module 39, and a trainer 40. In some embodiments, the controller 28 may execute the processes described below with reference to FIG. 2 and coordinate the operation of the components of the project management computer system 12.

In some embodiments, the server 30 may monitor a network socket, such as a port and Internet protocol address of the project management computer system 12, and mediate exchanges between the controller 28 and the network 26. In some embodiments, the server 30 is a non-blocking server configured to service a relatively large number of concurrent sessions with developer computing devices 14, such as more than 100 or more than 1000 concurrent sessions. In some embodiments, multiple instances of the server 30 may be disposed behind a reverse proxy configured to operate as a load balancer, for instance, by allocating workload to different instances of the server 30 according to a hash value of a session identifier.

In some embodiments, the user repository 32 includes records identifying users of the project management computer system 12 under various tenant accounts. In some cases, this may include a tenant record listing a plurality of user records and roles and permissions of those users. In some embodiments, each user record may indicate credentials of the user, a unique identifier of the user, a role of the user, and configuration preferences of the user. In some cases, the number of users may be more than 100,000 users for more than 10,000 tenants.

In some embodiments, the user repository 32 may include a plurality of workflows associated with user accounts, such as workflows by which a given type of software issue report is addressed or a feature is added or a new version of code is released. In some cases, the user repository 32 may include a plurality of tenant records and each tenant record may include a plurality of teams, each team listing users on a respective team and in some cases roles of users on the team or role names (e.g., job titles) of users on the team. Further, in some cases, each of these teams or the tenants may be associated with corresponding workflow definitions. In some cases, the workflow definitions may include a sequence of tasks to be performed in the course of the workflow. In some embodiments, the project management system 12 may be operative to present tasks in those workflows assigned to users in user interfaces via the server 30 on the user computing devices or developer computing devices 14 or 24.

The workflow execution log 33 may include a plurality of workflow instance records. In some embodiments, each workflow instance record documents a previous instance in which a given workflow was executed. In some embodiments, each workflow instance record may include an identifier of the workflow, an identifier of the instance of that workflow, an identifier of a tenant of the project management system that has a project in which the workflow is executed, and a list of task records of tasks performed in the course of the workflow. In some embodiments, each task record may include an identifier of a user that performed the task, an identifier of the task, a description of the task, a time at which the task was started, and a time at which the task was completed. In some embodiments, the workflow execution log 33 may be a relational database or a noSQL database, for instance, storing workflow instance records in serialized hierarchical documents, like XML or JSON. In some embodiments, the workflow execution log 33 may store a relatively large number of such documents, for instance, more than 1000, and in many commercially relevant use cases, more than 10,000 or more than 100,000 workflow instance records. In some embodiments, the workflow instance records may be gathered over a trailing duration of time, for instance, over more than a previous week, month, year, or longer. In some cases, a given workflow may correspond to a plurality of different workflow instance records in which that given workflow was performed. In some cases, the workflow instance records may be associated with a software-issue report addressed by the workflow instance, e.g., a software-issue report that spawned the workflow instance.

In some embodiments, the status repository 34 may include a plurality of project records, each project record corresponding to a project for which status is tracked. In some embodiments, the project records may include a workflow, a current status in the workflow, and tasks associated with various stages of the workflow. In some cases, the tasks may be arranged sequentially or concurrently, indicating whether one task blocks (i.e., must be completed before) a subsequent task. In some cases, the tasks may be associated with respective roles indicating a person or role of people to whom the task is to be assigned (or in some cases, one or both of these attributes may be blank in some records), in some cases referencing records in the user repository 32. In some embodiments, as users progress through tasks, the project management computer system 12 may receive updates from users interacting with user interfaces of the project management computer system presented on remote computing devices of the users. The status repository records may be updated to reflect the reported changes, e.g., that a task is complete, a task is to be reassigned to a different user, a new workflow is initiated, a new project is initiated, or the like.

In some embodiments, the status repository 30 may further include a plurality of workflow instance state records, each workflow instance state record including a workflow that has not yet been completed or otherwise closed. Each workflow instance state record may include a partial workflow instance record like those described above in the workflow execution log 33, for instance documenting task records for tasks that have been completed and including a list of incomplete tasks. In some cases, the workflow instance state records may indicate which tasks are necessarily precursors to other tasks and which tasks can be performed concurrently. In some embodiments, users of the project management system 12, via a user interface on the respective computing devices 14 or 24, may define workflows and enter updates in the status of ongoing workflows in which they participate. A new workflow instance state record may be created upon initiating a new instance of a workflow, and that state record may be transferred to the workflow execution log 33 upon completion or closing of the workflow instance being indicated by a user via a user interface.

In some cases, a sequence of tasks may be generated by controller 28 responsive to submission by a computing device 14 or 24 of a software-issue report stored in the issue repository 18. For example, such a project may include a triage task to evaluate whether the software-issue report is valid or has already been addressed, a diagnostic task, a code-change task by which the change is implemented, a unit test task by which unit tests are run (or written for new code) and results analyzed, a quality assurance task by which the submission is tested, a partial release task by which code implementing the change is released to a test environment or sample of a user base, and a full release task by which the code change is released in a non-test, production version of the corresponding application. In some embodiments, different users (e.g., in virtue of having a role or being in a group) may be assigned different ones of these different tasks, and the status of each software-issue report through such a workflow may be tracked. In some cases, different tenants or applications may have workflow templates associated therewith in memory of the system 12, and a template defining such a workflow, or other different workflows, may be managed by controller 28 based on such templates.

In some cases, issue submissions, such as software-issue reports may be sent by users or developers to the version control computer system 16, which may emit an event to the project management computer system 12 containing a description, such as the full record, of the report, or in some cases, software-issue reports may be submitted to the project management computer system 12, which in some cases, may house the issue repository 18. In some embodiments, each of the version control computer system and code repositories 20 may also be integrated with the project management computer system 12. In some cases, software-issue reports may be obtained via CA Agile Central, available from CA, Inc. of Islandia, N.Y.

In some embodiments, the view generator 36 may be configured to generate various user interfaces by which users view the status of their projects, dashboards, and task queues, as well as create new (or modify) workflows and projects. In some cases, these views may include a queue of tasks for a given user, a queue of tasks for a group of users in a role, a queue of tasks for a project, or the like. In some cases, these views may further include a graphical representation of the status of a given project through a workflow, for instance, indicating which tasks has been performed, which tasks remain to be performed, and which tasks are serving as blocking tasks for other sequential tasks. In some embodiments, these views may be presented on developer computing devices 14. In some embodiments, the project management computer system 12 is configured to cause presentation of these views by sending instructions to the developer computing devices 14 to render the views (e.g., with webpage markup and scripting rendered in a client-side browser). Or in some cases, the project management computer system 12 may be executed by one of the developer computer systems 14, and causing presentation may include instructing the same computing device to present the view. In some embodiments, the views may be encoded as dynamic webpages, for instance, in hypertext markup language and include various scripts responsive to user inputs and configured to send data indicative of those inputs to the project management computer system 12.

In some embodiments, the software-issue graph 35 stores records indicating relationships between software-issue reports. In some cases, each software-issue report may correspond to a node in the graph, and a relationship therebetween may correspond to (e.g., be encoded by) an edge in the graph. In some cases, the software-issue graph 35 may take the form of a graph database, for example, a Neo4J™ database storing a set of records each identifying a first node, a relationship, and a second node connected to the first node by the relationship. In some embodiments, the software-issue graph 35 maintains index free adjacency to facilitate relatively fast interrogation of the data structure, for instance, without imposing a relatively large overhead from maintaining indexes, though embodiments are also consistent with use of other data repositories, like relational databases. In an example, all members of a group may be retrieved relatively quickly by requesting all nodes connected to a node correspond to the group by an edge that indicates membership. Thus, the graph data structure may afford relatively fast operation compared to many traditional systems based on relational databases in which such relationships are evaluated by cumbersome join operations extending across several tables or by maintaining redundant indexes that slow updates. (Though, embodiments are also consistent with use of relational databases instead of graph databases, as multiple, independently useful techniques are described).

In some embodiments, the relationships in the software-issue graph 35 are directed relationships, indicating a direction in which the relationship operates. Examples include one node being a genus to another node that is a species of that genus. In some cases, these may be referred to as parent-child relationships. In another example of a directed relationship, one node (corresponding to one software-issue report) may have a sequential relationship with another node, for instance, indicating that one node must be addressed (e.g. fixed, resolved, closed, or otherwise disposed of) before another node is addressed. For instance, a backend data model change may be required before a front-end feature request can be addressed. In some cases, a given node may have a plurality of different types of relationships with another given node. In some cases, a given node may have a plurality of relationships with a plurality of other nodes. In some embodiments, relationships between nodes are not directed. For example, nodes may be duplicates of one another.

In some embodiments, edges may be weighted, for instance, with a value indicating a strength of a relationship. Examples may include an edge weight indicating that one software-issue report is a duplicate of another software-issue report with 90% probability, or that one software-issue report is a genus of another software-issue report with 70% probability.

Data structures need not be expressly labeled as graphs in program code to constitute graphs. The relationships of a graph may be encoded in a variety of other types of data structures that are not necessarily referred to as graphs in source code, such as in tables of a relational database, self-referencing objects in program state of an object oriented process, key-value pairs, and cross-references among entries in a hierarchical serialization format document, like extensible markup language (XML) or JavaScript™ object notation (JSON).

In some embodiments, the software-issue graph may include multiple disconnected sub-graphs, for instance, having collections of nodes in each sub-graph that are not reachable by nodes of other sub-graphs through relationships. In some embodiments, each of the software-issue reports in the issue repository 18 may correspond to a different node in the software-issue graph 35, and those nodes may include as attributes (e.g., as identifiers) a reference to (e.g., a unique reference, like an SHA-256 hash of) a software-issue report, such that a node uniquely identifies a report and vice versa.

In some embodiments, the selector 37 may be operative to search the software-issue graph 35 according to various queries, such as those expressed by the controller 28. Examples of queries include a query specifying a given node corresponding to a given software-issue report and indicating that responsive software-issue reports are those having a particular type of relationship with that given software-issue report, such as being a duplicate, being a species, being a genus, sequentially proceeding, or sequentially following. In some embodiments, queries may combine multiple instances of these criteria. In some embodiments, queries may specify all nodes reachable via various types of relationships, e.g., by invoking the recursive traversal techniques described below. In some embodiments, the selector 37 may apply these criteria to the software-issue graph 35 and identify responsive software-issue reports.

In some embodiments, the graph manager 39 may analyze software-issue reports in the issue repository 18, for instance, using input from users, the model module 38 having models trained by the trainer 40, and various other techniques to identify relationships between software-issue reports. The graph manager 39 may be configured to add corresponding edges to the software-issue graph 35. In some embodiments, the controller 28 may send instructions to a developer computing device 14 to present a user interface, for instance, in a web browser, by which a user may manually specify relationships between software-issue reports. In some cases, this user interface includes a plurality of software-issue reports and inputs by which a user may designate pairs of the software-issue reports as having various types of relationships. In some embodiments, these relationships may be pre-populated with the models described below, and a user may verify, modify, or remove those relationships via the user interface. In some embodiments, this and the other user interfaces described herein may include various event handlers configured to receive user input events (e.g., on-touch or on-click events) corresponding to designated areas in a display screen and cause values indicative of the selections to be sent back to the project management computer system 12, which may take responsive action. The server 30 may receive these values and invoke corresponding functionality in the controller 28 to update various records in the project management computer system 12, e.g., by calling the appropriate module with the value returned from the user interface.

Further, in some cases, the graph manager 39 may be configured to augment the graph with additional attributes pertaining to nodes or edges. In some cases, the graph manager 39 may be configured to augment the graph with inferred priorities of software-issue reports using techniques described below with reference to FIG. 2. Or in some cases these priorities may be manually designated with a user interface like that described above by users, such as users operating developer computing devices 14.

In some embodiments, the model 38 may include a suite of different machine-learning models that are trained by trainer 40 to construct the software-issue graph 35 or update the software-issue graph 35 based on records in the issue repository 18. The model module 38 may include various types of models trained by (or otherwise formed by) the trainer 40. In some embodiments, models are specific to a tenant, a project, or a body of code, such as a framework or library that may have code shared by multiple tenants, like open source libraries.

In some embodiments, the model 38 is configured to detect duplicate software-issue reports. To this end, some embodiments may execute a latent-semantic analysis of structured or unstructured text in the software-issue reports. Some embodiments may form a feature vector for each software-issue report, where the future vector has a plurality of dimensions, each dimension corresponding to an n-gram of text appearing in the software-issue report. Example n-grams may be a single term, two consecutive terms, three consecutive terms, four consecutive terms, or the like. In some embodiments, the number of dimensions of the feature vectors may be relatively large, for instance more than 100, and in many commercially relevant use cases more than 1000 or more than 10,000.

In some embodiments, the value of each dimension may be based on the occurrence of the corresponding n-gram in the corresponding software-issue report. Thus, in many cases, the feature vectors may be sparse vectors. In some embodiments, the value is based on both a number of times the n-gram occurs in the respective software-issue report and the number of times the n-gram occurs in some other larger body of text, such as in all of the software-issue reports. For example, in some cases, the value of a given dimension is a term-frequency inverse-document frequency score, such as BM25 score that is based on a number of times the corresponding n-gram appears within the software-issue report divided by a number of n-grams in the software-issue report to produce a term frequency. In some cases, this term-frequency may be divided by an average term frequency for the corresponding n-gram in all software-issue reports, thereby ascribing larger values to terms that occur relatively infrequently in other documents but relatively frequently in the given software-issue report for which a feature-vector is being formed.

In some embodiments, software-issue reports may be determined to be related in various ways based on these feature vectors. For example, some embodiments may determine that two documents are related to one another in the form of being duplicates of on one another based on a distance between their corresponding feature vectors. Distance may be determined with a variety of different measures, including an angular distance and Euclidean distance. In some cases, the distance is a cosine distance between a respective pair of feature vectors, or in some cases, the distance may be a Minkowski distance. Some embodiments may compare these distances to a threshold distance and designate software-issue reports having closer than a threshold distance as having a duplicate relationship in the software-issue graph 35. Or in some cases, a weight of an edge in the graph may indicate the distance or be based on the distance.

In another example, the model 38 may be configured to determine species-genus relationships between software-issue reports. Some embodiments may cluster software-issue reports with a topic model, such as an unsupervised topic model, like Latent Dirichlet allocation. In some embodiments, the topic model may assign scores pertaining to each of a plurality of different topics to each of the software-issue reports, and some embodiments may designate the software-issue reports having greater than a threshold score as being members of a group for that topic.

In another example, some embodiments may determine groups based on a supervised machine learning model. For instance, some embodiments may form feature vectors like those described above for groups of manually labeled software-issue reports and then match later software-issue reports to these groups based on distances between these feature vectors and feature vectors of the new software issue reports.

For each group, some embodiments may then identify a software-issue report or set of software-issue reports that are representative of the group as genus software-issue reports for the other software-issue reports in the group. For example, some embodiments may designate those software-issue reports having a highest topic score for the group as genus software-issue reports for the other software-issue reports in the group, which may have a species relationship to that genus software-issue report. Or some embodiments may designate a software-issue report having a feature vector closest to (or within a threshold distance of) a centroid of feature vectors of a group as corresponding to a genus. In another example, some embodiments may determine species-genus relationships based on two-way analysis co-occurrence of n-grams between software-issue reports, e.g., in response to determining the n-grams in one software-issue report in a group are a superset of more than a threshold amount (e.g., frequency or count) of n-grams of other software-issue reports in the group.

In some embodiments, the model 38 may be configured to infer sequential relationships between software-issue reports. A variety of different techniques may be used to infer the sequential relationships. Some embodiments may construct a hidden Markov model of software-issue reports based upon those software-issue reports addressed in the workflow execution log 38, for instance, by identifying sequences of software-issue reports addressed by a given user, a given project, or a given team and constructing a (e.g., user, project, or team-specific) transition probability matrix for various types of software-issue reports based upon sequences exhibited in the workflow execution log 33. In some cases, the transition probability matrix may be constructed with the Baum-Welch algorithm. In some cases, rows and columns of the transition probability matrix (which may be a square matrix) may correspond to the same list of types of software-issue reports. Types of software-issue reports may be identified, for instance, with the techniques described above by which software-issue reports are clustered according to topic. Or types of software-issue reports may be determined based upon clustering of feature vectors, for instance with a Markov clustering of feature vectors. In some cases, the transition probability matrix may be pruned to identify those relationships having greater than a threshold probability.

The transition probability matrix may then be applied to new software-issue reports by determining which type of software-issue report the new report embodies (e.g., with the same techniques by which types are determined) and then accessing the corresponding transition probabilities in the transition-probability matrix. New software-issue reports may be clustered or otherwise grouped with the techniques described above being applied to the new software-issue report.

In another example, sequences may be inferred by training a recurrent neural network having cyclical connections of perceptrons on the sequences in the workflow execution log 33, like the sequences described above by which a hidden Markov model may be trained. For example, some embodiments may execute a stochastic gradient descent to determine weights in a long-short term memory (LSTM) model based on historical data. In some embodiments, the neural network may be trained with a gradient descent algorithm, such as a stochastic gradient descent or simulated annealing. For instance, some embodiments may randomly select initial weights for inputs to the various preceptrons in the neural network. In some embodiments may then determine an aggregate measure of fitness or error for the neural network as it exists with the current parameters relative to the training set. Some embodiments may, for instance, determine a root mean square error, a misclassification error rate, or a correct classification rate by determining how often the currently existing model predicts some values of the workflow instance records based on other values of the workflow instance records. Examples include predicting which type of software-issue report is addressed next in the workflow-execution log after a given software-issue report (or sequence of issue reports) is addressed.

In some embodiments, a partial derivative of the aggregate measure of fitness or error with respect to each parameter (e.g., weight) may be determined or otherwise estimated, and some embodiments may adjust the then current parameter value in a direction that the partial derivative indicates will increase fitness or decrease error in the aggregate relative to the training set. Some embodiments may repeat this measurement and adjustment step iteratively until a termination of condition occurs and is detected. Some embodiments may repeat this process iteratively until a threshold amount of iterations have occurred. Some embodiments may repeat this process iteratively until an amount of change between the amount of fitness or error in the aggregate between successive iterations changes by less than a threshold amount, thereby indicating a local minimum or maximum or possibly global minimum or maximum in error or fitness.

In some cases, models may converge on a local minimum or maximum based on the starting conditions. Accordingly, some embodiments may train multiple candidate models with different starting conditions, such as randomly selected initial weights (e.g. pseudo-randomly selected initial weights), and some embodiments may select a candidate model or result that at the end of training produces the highest aggregate measure of fitness or lowest aggregate measure of error relative to a training set, such as a cross validation training set.

In some embodiments, the resulting parameters of the model may be stored in memory (a term which is used broadly to include persistent storage).

The resulting sequential relationships between software issue reports may be written to the software-issue graph 35 by the graph manager 39 upon the model 38 being applied to a new software-issue report. Thus, models may be trained in advance of those models being applied to new software issue reports. In some cases, software-issue reports may be added to the software-issue graph 35 in response to those software-issue reports being received, while models may be trained or otherwise updated or constructed in a batch process, for instance, less often than nightly, weekly, or monthly. In some cases, models may be trained upon a relatively large number of previous workflow execution instance records, for instance, more than 10,000 or more than 100,000 gathered over a trailing duration, like more than a week, more than a month, or more than a year.

Figure 2:
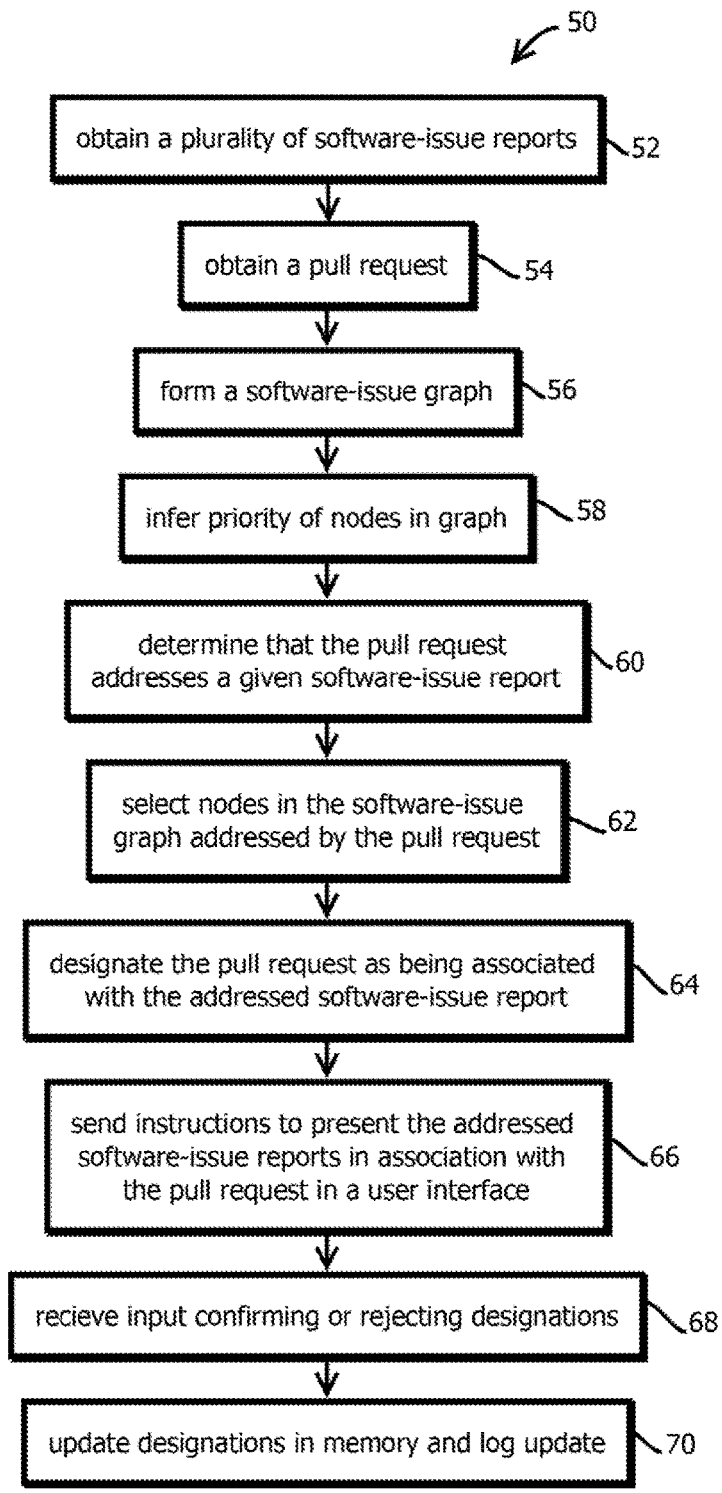
FIG. 2 shows an example of a process to form a software-issue graph in accordance with some embodiments.

In some embodiments, the project management computer system of FIG. 1 may execute a process 50 described below with reference to FIG. 2, though embodiments are not limited to systems having that arrangement, which is not to suggest that any other description herein is limiting of all embodiments. Program code by which the functionality of FIG. 2 is implemented, and the other functionality described herein, may be encoded on a tangible, non-transitory, machine-readable medium, such that when that program code is executed, one or more processors, for instance, in one or more computers like those described below with reference to FIG. 3, may effectuate the described operations. Operations may be performed in a different order from that described, operations may be omitted, and some operations may be replicated, for instance, in multiple instances concurrently, none of which is to suggest that other descriptions are limiting.

In some embodiments, the process 50 begins with obtaining a plurality of software-issue reports, as indicated by block 52. In some cases, the plurality may be a collection of software-issue reports like those described above having a portion that are already reflected in a software-issue graph and a new portion that has not yet been added to the graph. Next, some embodiments may obtain a pull request, as indicated by block 54. In some cases, the pull request may be obtained upon a developer submitting a pull request to the above-described version control system. In some cases, the pull request may reference a branch of source code in the version control system that the developer proposes to merge back into another branch, and the pull request may invite various other team members to perform various other tasks, such as unit tests, AB testing, and quality assurance tasks. In some cases, the pull request may reference a hash value of a commit by which the source code changes were submitted. In some platforms, the pull request may be referred to as merge request. In some cases, the pull request may be received by the version-control system omitting an event indicative of the pull request, or in some cases the pull request may be submitted to the project management computer system directly.

Some embodiments may form a software-issue graph, as indicated by block 56. As noted above, in some cases, some or all of the software-issue graph may be formed before obtaining the pull request. In some embodiments, forming the software-issue graph may include determining that software-issue reports have the types of relationships described above and storing those relationships in the above-described software-issue graph. In some cases, determining includes determining based upon a user input explicitly specifying the relationship, or in some cases, the various machine learning models described above may determine the relationships between software-issue reports by which the software-issue graph is formed. In some cases, the machine-learning models described above may identify candidate relationships, and some embodiments may send a user interface to a client computing device by which a user may edit those relationships, for instance, by deleting, modifying, or adding relationships to correct errors. Some embodiments may log these corrections and train the models upon the corrections to improve the above-described models.

The software-issue graph may be used for a variety of purposes, examples including inferring priority of nodes in the graph, as indicated by block 58. As noted, the nodes may correspond to software-issue reports, and some software-issue reports may be higher priority than others. Some embodiments may infer of these priority attributes based upon relationships in the software-issue report. For example, some embodiments may score the priority of nodes based upon a number of nodes that are reachable from that node. A node may be determined to be reachable based upon that node sharing an undirected edge with that node or sharing a directed edge that indicates the other node is subsequent sequentially or a species. Reachable nodes further include other downstream nodes that are connected through the same types of relationships to the initial node, either indirectly or through other nodes.

In some embodiments, the reachable nodes may be identified with a recursive traversal of the software-issue graph. In some cases, the traversals may apply various criteria to exclude edges corresponding to various types of relationships and include edges correspond to other types relationships to determine which edges to traverse. Some embodiments may include a traversal routine that accepts as a parameter an identifier of a current node in the traversal. Some embodiments may then interrogate the software-issue graph to identify edges of that current node and filter out (e.g., exclude from further consideration) those edges that do not satisfy various criteria specified in the traversal, such as that the edge be of a particular type of relationship, that the edge be directed in a particular direction, or that the edge have greater than a threshold weight or less than a threshold weight, for instance. Some embodiments may further filter out edges that have already been traversed to avoid repeatedly cycling through the graph through cyclical portions. Filtering out edges that have already been traversed may also include disregarding nodes (or edges to nodes) that have already been visited and previously served as a current node, an operation which may also be referred to as filtering out an edge. Some embodiments may then iterate through the list of remaining edges that have not been filtered out and for each remaining edge call the recursive traversal routine identifying a node at another end of that edge from the current node as a current node in the routine call. In some embodiments, the recursive traversal routine may update a list of visited nodes and report back a list of nodes responsive to the types of criteria described.

In some cases, amounts of reachable nodes may be determined for each node in the software-issue graph, and some embodiments may normalize these respective amounts (e.g. counts), for instance, by dividing the counts by an average count. In some embodiments, priorities may also be based upon other attributes, such as based upon priorities in historical software-issue reports deemed to be similar to the respective software-issue report, for instance, based upon the technique described above by which duplicate software-issuer reports are detected, for instance with a different, lower threshold for similarity.

In some embodiments, the resulting priorities may be stored in the software-issue report as attributes of the respective nodes. User interfaces depicting these nodes may include visual attributes that indicate priority (e.g., order in a list, font size, bolding, color, position, etc.).

Next, some embodiments may determine that the pull request addresses a given software-issue report, as indicated by block 60. In some cases, this determination may be made by a user expressly identifying in a user interface the given software-issue report, for instance, upon submitting the pull request or after viewing the pull request. In some cases, the pull request may be associated with a workflow execution instance, and that workflow execution instance state record may identify the given software-issue report. Or in some cases, the given software-issue report may be inferred, for instance, based on the pull request or the body of code changed in the pull request. For instance, some embodiments may match keywords in the pull request to keywords in the software-issue report. Or some embodiments may perform a latent semantic analysis matching between the text of the pull request and the software-issue reports to identify the software-issue reports having feature vectors most similar to the text of the pull request.

Next, some embodiments may select nodes in the software-issue graph addressed by the pull request, as indicated by block 62. In some cases, this may include performing the above-describe traversal routine, such as a recursive traversal, starting with the node corresponding to the given-software issue report determined to be addressed in block 60. In some cases, a plurality of software-issue reports may be obtained in the operation of block 62 other than the given software-issue report, such as those that are duplicates of the given-software-issue report, or those that are species of the software-issue report.

Next, some embodiments may designate the pull request as being associated with the addressed software-issue reports in memory, as indicated by block 64. The address software-issue reports may include both of those obtained or otherwise determined in the operations of block 60 and 62. In some cases, the designation includes appending an identifier of the pull request as an attribute of the nodes in the software-issue graph corresponding to the addressed software-issue reports. Or some embodiments may append a list of the addressed software-issue reports to the pull request.

Next, some embodiments may send instructions to present the addressed software-issue reports in association with the pull request in a user interface, as indicated by block 66. Some embodiments may then receive input confirming or rejecting the designations, as indicated by block 68. For instance, a user may indicate that a software-issue report deemed to be addressed in block 60 or 62 is not in fact addressed. Further, some embodiments may receive indications of additional software-issue reports submitted via the user interface. Next, some embodiments may update designations in memory and log the updates, as indicated by block 70. In some cases, these updates may be recorded with the data structures described above by which the address software issue reports are associated with the pull request. Some embodiments may refine the above-describe models by training those models on the logged updates, thereby correcting the models with user input.

Figure 3:
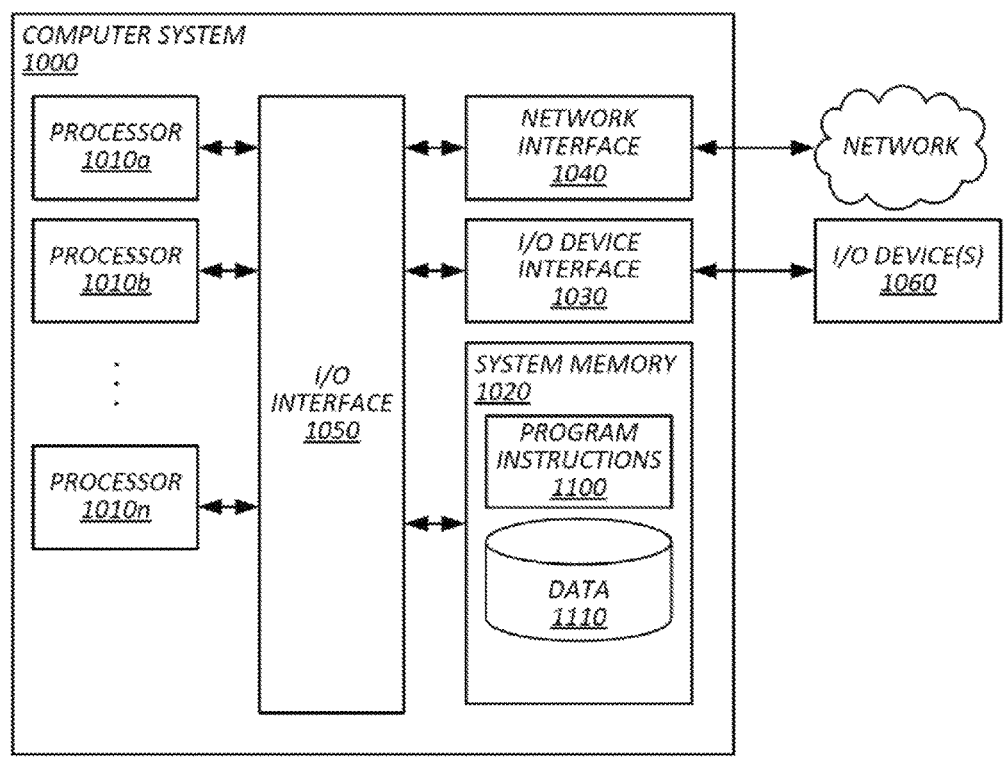
FIG. 3 shows an example of a computer system by which the above-described techniques may be implemented.

FIG. 3 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010*a*-1010*n*) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010*a*-1010*n*, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:
1. A method, comprising: obtaining, with one or more processors, a plurality of software-issue reports, each software-issue report describing a software bug to be fixed or feature to be added to a software application; obtaining, with one or more processors, a pull request identifying a branch of source code of the software application in a version control system; forming, with one or more processors, a software-issue graph having a plurality of nodes corresponding to the software-issue reports and a plurality of edges indicating relationships between the software-issue reports, wherein forming the software-issue graph comprises at least one of the following: determining that a first software-issue report must be addressed before a second software-issue report and, in response, adding an edge to the software-issue graph indicating the first software-issue report must be addressed before the second software-issue report; determining that a third software-issue report is a duplicate of a fourth software-issue report and, in response, adding an edge to the software-issue graph indicating the third software-issue report is a duplicate of the fourth software-issue report; or determining that a fifth and a sixth software-issue report each are a species of a seventh software-issue report and, in response, adding a pair of edges to the software-issue graph indicating the fifth and the sixth software-issue report each are a species of the seventh software-issue report; determining, with one or more processors, that the pull request addresses a given software-issue report; selecting, with one or more processors, a subset of nodes in the software-issue graph addressed by the pull request based on the subset of nodes sharing a respective edge with the given software-issue report and respective relationships indicated by the shared edges; and designating, with one or more processors, in memory, the pull request as being associated with the given software-issue report and the plurality of software-issue reports corresponding to the selected subset of nodes.
2. The method of embodiment 1, wherein forming the software-issue graph comprises: determining that the first software-issue report must be addressed before the second software-issue report and, in response, adding the edge to the software-issue graph indicating the first software-issue report must be addressed before the second software-issue report; determining that the third software-issue report is a duplicate of the fourth software-issue report and, in response, adding the edge to the software-issue graph indicating the third software-issue report is a duplicate of the fourth software-issue report; and determining that the fifth and the sixth software-issue report each are a species of a seventh software-issue report and, in response, adding the pair of edges to the software-issue graph indicating the fifth and the sixth software-issue report each are a species of the seventh software-issue report.
3. The method of any one of embodiments 1-2, wherein selecting the subset of nodes comprises recursively traversing the software-issue graph by: accessing a current node corresponding to the pull request and a set of edges connecting to the current node; filtering out first edges in the set of edges based on the filtered first edges having already been traversed; filtering out second edges in the set of edges based on the filtered second edges indicating a directionality of a relationship in a given direction; and forming a set of connected nodes based on the connected nodes being connected to the current node by unfiltered edges among the set of edges; and recursively calling a routine that traverses the software-issue graph with at least one node in the set of connected nodes identified by parameter in the routine call.
4. The method of any one of embodiments 1-3, comprising: obtaining a log of historical workflow instances addressing software-issue reports; and training a machine learning model used to form the software-issue graph with the log of historical workflow instances.
5. The method of any one of embodiments 1-4, comprising: causing, via a network, a client computing device to display a user interface associating the pull request as being associated with the given software-issue report and the plurality of software-issue reports corresponding to the selected subset of nodes, wherein the user interface includes an event handler operative to receive user inputs selecting among the plurality of software-issue reports corresponding to the selected subset of nodes and cause a value to be sent indicative of the selection via the network.
6. The method of any one of embodiments 1-5, comprising: causing a client computing device to display a plurality of nodes of the graph in a force directed layout or a tree layout.
7. The method of any one of embodiments 1-6, comprising: inferring a priority of a software-issue report based on a relationship indicated by an edge of the software-issue graph, wherein inferring the priority is based on: determining that the first software-issue report must be addressed before the second software-issue report; and determining that the fifth and the sixth software-issue report each are a species of a seventh software-issue report, wherein the priority is of the first software issue report and the first software-issue report is the same software-issue report as the seventh software-issue report.

8. The method of any one of embodiments 1-7, wherein determining that the pull request addresses the given software-issue report comprises: receiving a designation supplied by a user via a user interface indicating that the pull request addresses the given software-issue report.

9. The method of any one of embodiments 1-8, wherein determining that the pull request addresses the given software-issue report comprises: inferring that the pull request addresses the given software-issue report with a supervised machine learning model trained on previous designations of previous software-issue reports as being addressed by previous pull requests.

10. The method of any one of embodiments 1-9, comprising determining that the fifth and the sixth software-issue report each are a species of the seventh software-issue report and, in response, adding the pair of edges to the software-issue graph indicating the fifth and the sixth software-issue report each are a species of the seventh software-issue report by: forming a first plurality of clusters at a first level of granularity; forming a second plurality of clusters at a second level of granularity that is greater than the first level of granularity, wherein a given cluster in the first plurality of clusters contains a plurality of clusters in the second plurality of clusters including the fifth and the sixth software-issue reports; and determining that the seventh software-issue report is representative of the given cluster.

11. The method of any one of embodiments 1-10, comprising determining that the third software-issue report is a duplicate of the fourth software-issue report and, in response, adding the edge to the software-issue graph indicating the third software-issue report is a duplicate of the fourth software-issue report by: forming, for each of a plurality of the software-issue reports, respective feature vectors having dimensions corresponding to n-grams in the respective software-issue reports, wherein the values of the dimensions are based on both a number of times a respective n-gram occurs in the respective software-issue report and a number of times the respective n-gram occurs in other software-issue reports; determining pairwise distances between the feature vectors; and designating software-issue reports as duplicates based on the pairwise distances.

12. The method of any one of embodiments 1-11, comprising determining that the first software-issue report must be addressed before the second software-issue report and, in response, adding the edge to the software-issue graph indicating the first software-issue report must be addressed before the second software-issue report by: determining weights in a cyclic neural network by iteratively adjusting the weights to reduce an amount of error or increase an amount of fitness of the cyclic neural network in predicting sequences of software-issue reports being addressed in a historical training set of previously addressed software-issue reports.

13. The method of any one of embodiments 1-12, comprising determining that the first software-issue report must be addressed before the second software-issue report and, in response, adding the edge to the software-issue graph indicating the first software-issue report must be addressed before the second software-issue report by: forming, based on a historical log indicating sequences with which previous software-issue reports were addressed, a transition probability matrix indicating pairwise probabilities of transitioning from a software-issue report corresponding to a row of the transition probability matrix to a software-issue report corresponding to a column of the transition probability matrix; pruning the transition probability matrix to identify values having greater than a threshold probability; and adding edges to the software-issue graph between nodes corresponding to values of the transition probability matrix having values greater than the threshold probability.

14. The method of any one of embodiments 1-13, wherein: forming the software-issue graph comprises steps for forming a software-issue graph.

15. The method of any one of embodiments 1-14, wherein forming the software-issue graph comprises: sending instructions to a client computing device to display a user interface identifying a plurality of software-issue reports in a web browser; receiving user inputs entered via the user interface and designating edges to be added to the software-issue graph; in response to receiving the user inputs, adding the designated edges to the software-issue graph in memory; and sending instructions to another client computing device to display an updated version of at least part of the software-issue graph in a native application executing on the other client computing device.

16. The method of any one of embodiments 1-15, comprising: operating a hosted project management application having a plurality of tenant accounts, each tenant account having one or more software projects to which at least some of the software-issue reports pertain.

17. The method of any one of embodiments 1-16, wherein the software-issue graph is formed based on a model that is updated based on user adjustments to previous outputs of the model indicating incorrect edges.

18. A tangible, non-transitory, machine-readable medium storing instructions that when executed by a data processing apparatus cause the data processing apparatus to perform operations comprising: the operations of any one of embodiments 1-17.

19. A system, comprising: one or more processors; and memory storing instructions that when executed by the processors cause the processors to effectuate operations comprising: the operations of any one of embodiments 1-17.

What is claimed is:

1. A method, comprising:
obtaining, with one or more processors, a plurality of software-issue reports, each software-issue report describing a software bug to be fixed or feature to be added to a software application;
obtaining, with one or more processors, a pull request identifying a branch of source code of the software application in a version control system;
forming, with one or more processors, a software-issue graph having a plurality of nodes corresponding to the software-issue reports and a plurality of edges indicating relationships between the software-issue reports, wherein forming the software-issue graph comprises at least one of the following:
determining that a first software-issue report must be addressed before a second software-issue report and, in response, adding an edge to the software-issue graph indicating the first software-issue report must be addressed before the second software-issue report;
determining that a third software-issue report is a duplicate of a fourth software-issue report and, in response, adding an edge to the software-issue graph indicating the third software-issue report is a duplicate of the fourth software-issue report; or determining that a fifth and a sixth software-issue report each are a species of a seventh software-issue report and, in response, adding a pair of edges to the software-issue graph indicating the fifth and the sixth software-issue report each are a species of the seventh software-issue report, wherein the software issue graph is formed with a machine-learning model obtained trained by obtaining a log of historical workflow instances addressing software-issue reports and training the machine learning model used to form the software-issue graph with the log of historical workflow instances, and the machine-learning model is updated based on user adjustments to previous outputs of the model indicating incorrect edges;

determining, with one or more processors, that the pull request addresses a given software-issue report;

selecting, with one or more processors, a subset of nodes in the software-issue graph addressed by the pull request based on the subset of nodes sharing a respective edge with the given software-issue report and respective relationships indicated by the shared edges;

designating, with one or more processors, in memory, the pull request as being associated with the given software-issue report and the plurality of software-issue reports corresponding to the selected subset of nodes.

2. The method of claim 1, wherein forming the software-issue graph comprises:

determining that the first software-issue report must be addressed before the second software-issue report and, in response, adding the edge to the software-issue graph indicating the first software-issue report must be addressed before the second software-issue report;

determining that the third software-issue report is a duplicate of the fourth software-issue report and, in response, adding the edge to the software-issue graph indicating the third software-issue report is a duplicate of the fourth software-issue report; and determining that the fifth and the sixth software-issue report each are a species of a seventh software-issue report and, in response, adding the pair of edges to the software-issue graph indicating the fifth and the sixth software-issue report each are a species of the seventh software-issue report.

3. The method of claim 1, wherein selecting the subset of nodes comprises recursively traversing the software-issue graph by:

accessing a current node corresponding to the pull request and a set of edges connecting to the current node;

filtering out first edges in the set of edges based on the filtered first edges having already been traversed;

filtering out second edges in the set of edges based on the filtered second edges indicating a directionality of a relationship in a given direction; and forming a set of connected nodes based on the connected nodes being connected to the current node by unfiltered edges among the set of edges; and recursively calling a routine that traverses the software-issue graph with at least one node in the set of connected nodes identified by parameter in the routine call.

4. The method of claim 1, comprising:

causing, via a network, a client computing device to display a user interface associating the pull request as being associated with the given software-issue report and the plurality of software-issue reports corresponding to the selected subset of nodes, wherein the user interface includes an event handler operative to receive user inputs selecting among the plurality of software-issue reports corresponding to the selected subset of nodes and cause a value to be sent indicative of the selection via the network.

5. The method of claim 1, comprising:

causing a client computing device to display a plurality of nodes of the graph in a force directed layout or a tree layout.

6. The method of claim 1, comprising:

inferring a priority of a software-issue report based on a relationship indicated by an edge of the software-issue graph, wherein inferring the priority is based on:

determining that the first software-issue report must be addressed before the second software-issue report; and determining that the fifth and the sixth software-issue report each are a species of a seventh software-issue report, wherein the priority is of the first software issue report and the first software-issue report is the same software-issue report as the seventh software-issue report.

7. The method of claim 1, wherein determining that the pull request addresses the given software-issue report comprises:

receiving a designation supplied by a user via a user interface indicating that the pull request addresses the given software-issue report.

8. The method of claim 1, wherein determining that the pull request addresses the given software-issue report comprises:

inferring that the pull request addresses the given software-issue report with a supervised machine learning model trained on previous designations of previous software-issue reports as being addressed by previous pull requests.

9. The method of claim 1, comprising determining that the fifth and the sixth software-issue report each are a species of the seventh software-issue report and, in response, adding the pair of edges to the software-issue graph indicating the fifth and the sixth software-issue report each are a species of the seventh software-issue report by:

forming a first plurality of clusters at a first level of granularity;

forming a second plurality of clusters at a second level of granularity that is greater than the first level of granularity, wherein a given cluster in the first plurality of clusters contains a plurality of clusters in the second plurality of clusters including the fifth and the sixth software-issue reports; and determining that the seventh software-issue report is representative of the given cluster.

10. The method of claim 1, comprising determining that the third software-issue report is a duplicate of the fourth software-issue report and, in response, adding the edge to the software-issue graph indicating the third software-issue report is a duplicate of the fourth software-issue report by:

forming, for each of a plurality of the software-issue reports, respective feature vectors having dimensions corresponding to n-grams in the respective software-issue reports, wherein the values of the dimensions are based on both a number of times a respective n-gram occurs in the respective software-issue report and a number of times the respective n-gram occurs in other software-issue reports;

determining pairwise distances between the feature vectors; and designating software-issue reports as duplicates based on the pairwise distances.

11. The method of claim 1, comprising determining that the first software-issue report must be addressed before the second software-issue report and, in response, adding the edge to the software-issue graph indicating the first software-issue report must be addressed before the second software-issue report by:

determining weights in a cyclic neural network by iteratively adjusting the weights to reduce an amount of error or increase an amount of fitness of the cyclic neural network in predicting sequences of software-issue reports being addressed in a historical training set of previously addressed software-issue reports.

12. The method of claim 1, comprising determining that the first software-issue report must be addressed before the second software-issue report and, in response, adding the edge to the software-issue graph indicating the first software-issue report must be addressed before the second software-issue report by:

forming, based on a historical log indicating sequences with which previous software-issue reports were addressed, a transition probability matrix indicating pairwise probabilities of transitioning from a software-issue report corresponding to a row of the transition probability matrix to a software-issue report corresponding to a column of the transition probability matrix;

pruning the transition probability matrix to identify values having greater than a threshold probability; and adding edges to the software-issue graph between nodes corresponding to values of the transition probability matrix having values greater than the threshold probability.

13. The method of claim 1, wherein:

forming the software-issue graph comprises steps for forming a software-issue graph.

14. The method of claim 1, wherein forming the software-issue graph comprises:

sending instructions to a client computing device to display a user interface identifying a plurality of software-issue reports in a web browser;

receiving user inputs entered via the user interface and designating edges to be added to the software-issue graph;

in response to receiving the user inputs, adding the designated edges to the software-issue graph in memory; and sending instructions to another client computing device to display an updated version of at least part of the software-issue graph in a native application executing on the other client computing device.

15. The method of claim 1, comprising:

operating a hosted project management application having a plurality of tenant accounts, each tenant account having one or more software projects to which at least some of the software-issue reports pertain.

16. A tangible, non-transitory, machine-readable medium storing instructions that when executed by one or more processors effectuate operations comprising:

obtaining, with one or more processors, a plurality of software-issue reports, each software-issue report describing a software bug to be fixed or feature to be added to a software application;

obtaining, with one or more processors, a pull request identifying a branch of source code of the software application in a version control system;

forming, with one or more processors, a software-issue graph having a plurality of nodes corresponding to the software-issue reports and a plurality of edges indicating relationships between the software-issue reports, wherein forming the software-issue graph comprises at least one of the following:

determining that a first software-issue report must be addressed before a second software-issue report and, in response, adding an edge to the software-issue graph indicating the first software-issue report must be addressed before the second software-issue report;

determining that a third software-issue report is a duplicate of a fourth software-issue report and, in response, adding an edge to the software-issue graph indicating the third software-issue report is a duplicate of the fourth software-issue report; or determining that a fifth and a sixth software-issue report each are a species of a seventh software-issue report and, in response, adding a pair of edges to the software-issue graph indicating the fifth and the sixth software-issue report each are a species of the seventh software-issue report, wherein the software issue graph is formed with a machine-learning model obtained trained by obtaining a log of historical workflow instances addressing software-issue reports and training the machine learning model used to form the software-issue graph with the log of historical workflow instances, and the machine-learning model is updated based on user adjustments to previous outputs of the model indicating incorrect edges;

determining, with one or more processors, that the pull request addresses a given software-issue report;

selecting, with one or more processors, a subset of nodes in the software-issue graph addressed by the pull request based on the subset of nodes sharing a respective edge with the given software-issue report and respective relationships indicated by the shared edges;

designating, with one or more processors, in memory, the pull request as being associated with the given software-issue report and the plurality of software-issue reports corresponding to the selected subset of nodes.

17. The medium of claim 16, wherein forming the software-issue graph comprises:

determining that the first software-issue report must be addressed before the second software-issue report and, in response, adding the edge to the software-issue graph indicating the first software-issue report must be addressed before the second software-issue report;

determining that the third software-issue report is a duplicate of the fourth software-issue report and, in response, adding the edge to the software-issue graph indicating the third software-issue report is a duplicate of the fourth software-issue report; and determining that the fifth and the sixth software-issue report each are a species of a seventh software-issue report and, in response, adding the pair of edges to the software-issue graph indicating the fifth and the sixth software-issue report each are a species of the seventh software-issue report.

18. The medium of claim 16, wherein determining that the pull request addresses the given software-issue report comprises:

inferring that the pull request addresses the given software-issue report with a supervised machine learning model trained on previous designations of previous software-issue reports as being addressed by previous pull requests.

\* \* \* \* \*